United States Patent
Motoda

(10) Patent No.: US 8,823,842 B2
(45) Date of Patent: Sep. 2, 2014

(54) IMAGE PROCESSING DEVICE

(71) Applicant: Panasonic Corporation, Osaka (JP)

(72) Inventor: Kazumasa Motoda, Osaka (JP)

(73) Assignee: Panasonic Corporation, Osaka (JP)

( * ) Notice: Subject to any disclaimer, the term of this patent is extended or adjusted under 35 U.S.C. 154(b) by 57 days.

(21) Appl. No.: 13/649,172

(22) Filed: Oct. 11, 2012

(65) Prior Publication Data

US 2013/0242126 A1 Sep. 19, 2013

(30) Foreign Application Priority Data

Mar. 16, 2012 (JP) ................................. 2012-059776
Jul. 26, 2012 (JP) ................................. 2012-166051

(51) Int. Cl.
  *H04N 5/217* (2011.01)
(52) U.S. Cl.
  USPC ........................................................ 348/241
(58) Field of Classification Search
  USPC .......................... 348/241, 243; 382/275, 276
  See application file for complete search history.

(56) References Cited

U.S. PATENT DOCUMENTS

| | | | |
|---|---|---|---|
| 2006/0110050 A1 | 5/2006 | Aoyama et al. | |
| 2009/0046179 A1 | 2/2009 | Aoyama et al. | |
| 2009/0190856 A1* | 7/2009 | Omori | ........................... 382/275 |
| 2009/0213393 A1 | 8/2009 | Morita | |

FOREIGN PATENT DOCUMENTS

| | | | |
|---|---|---|---|
| JP | 2004-080545 A | 3/2004 | |
| JP | 2009-200968 A | 9/2009 | |

* cited by examiner

*Primary Examiner* — Yogesh Aggarwal
(74) *Attorney, Agent, or Firm* — Renner, Otto, Boisselle & Sklar, LLP

(57) ABSTRACT

The line buffer stores an input image after a change is made to the stored line position of each horizontal segment. The stored-line position memory unit stores the stored line position of each horizontal segment in the line buffer. The vertical interpolator performs vertical interpolation on each of outputs of the line buffer based on the differences between the vertical interpolation line positions and the stored line positions. Thus, the number of lines needed for vertical interpolation to be stored in the line buffer can be reduced.

4 Claims, 8 Drawing Sheets

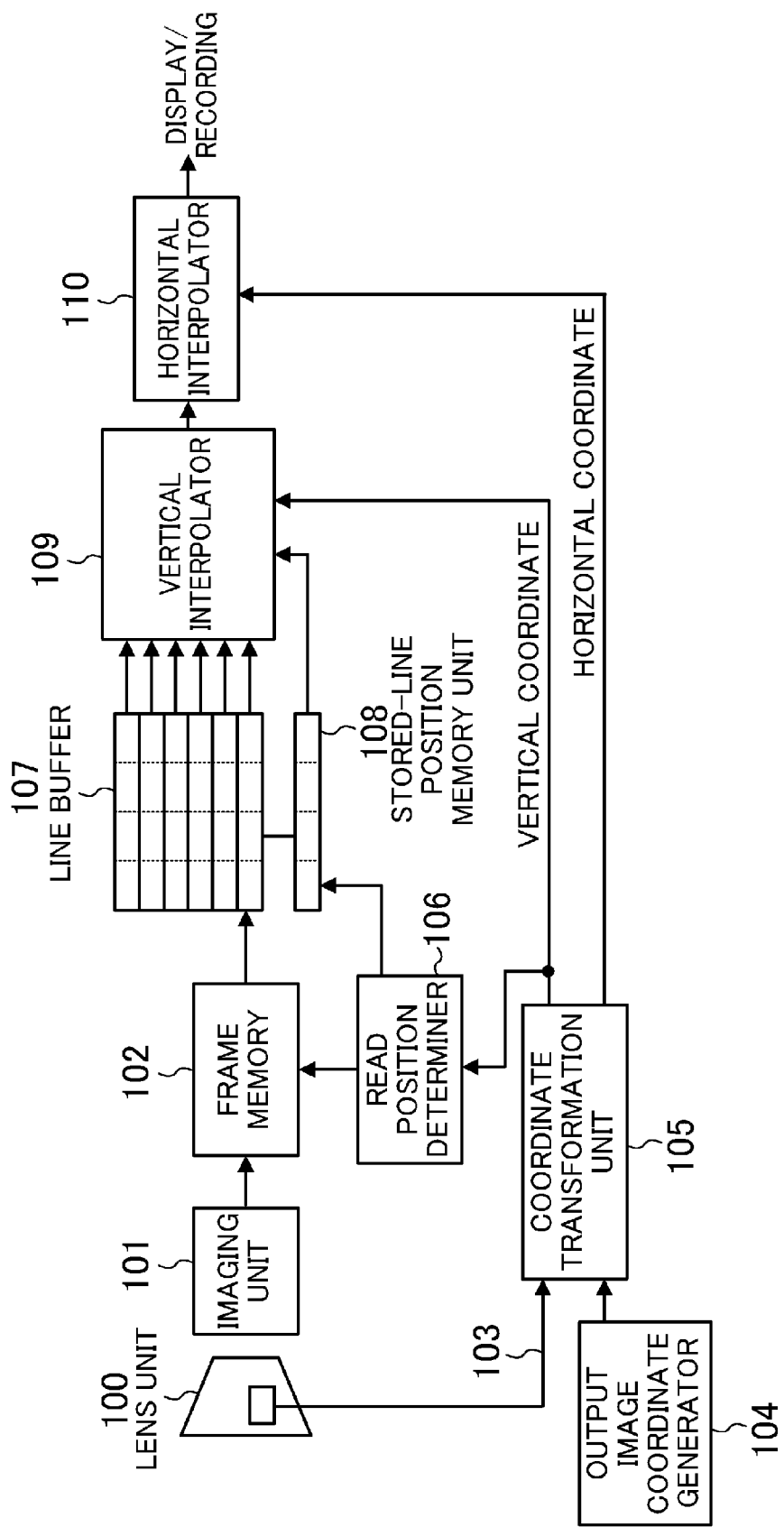

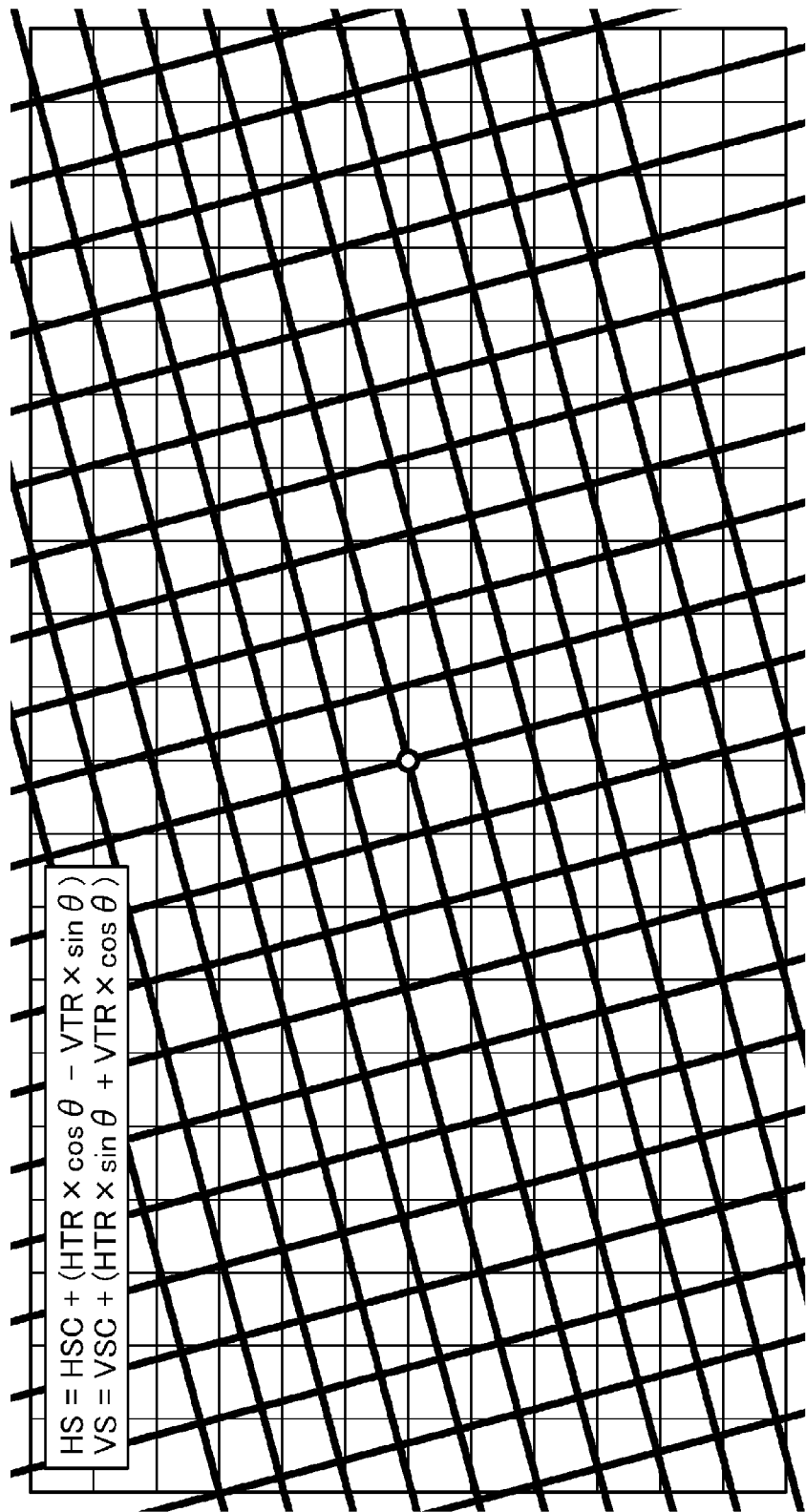

IMAGE PROCESSING DEVICE

CROSS-REFERENCE TO RELATED APPLICATION

This application claims priority to Japanese Patent Applications Nos. 2012-059776 filed on Mar. 16, 2012, and 2012-166051 filed on Jul. 26, 2012, the disclosure of which including the specification, the drawings, and the claims is hereby incorporated by reference in its entirety.

BACKGROUND

The present disclosure relates to image processing devices used in imaging devices such as digital still and video cameras, and more particularly to techniques of image transformation including scaling-up, scaling-down, and rotation of images.

Some conventional image processing devices correct optical distortion in lenses, that is, so-called lens distortion (also referred to simply as "distortion") in an electrical manner (see, e.g., Japanese Patent Publication No. 2004-080545 (Patent Document 1)). FIG. 8 illustrates a conventional image processing device described in Patent Document 1.

In FIG. 8, a horizontal correction unit 902 corrects horizontal distortion of an original image 900; a horizontally-corrected image memory unit 903 stores a horizontally-corrected image obtained by this correction operation; and then a vertical correction unit 904 selectively obtains a horizontally-corrected image from the horizontally-corrected image memory unit 903, and corrects vertical distortion thereof. The horizontal correction parameter provided to the horizontal correction unit 902 and the vertical correction parameter provided to the vertical correction unit 904 are generated in a decoder 901 by decoding a correction vector provided from the outside world. For example, when lens distortion is corrected, the correction vector is changed depending on a change in the lens position in order to perform real-time correction.

SUMMARY

However, such a conventional configuration requires a high-capacity line buffer to store image data having more number of lines than the sum of the amount of vertical displacement to be corrected in a vertical correction operation and the number of taps of the vertical interpolation filter used in the vertical correction operation, as the horizontally-corrected image memory unit 903 needed upstream of the vertical correction unit 904. Since this line buffer is configured by a high-priced memory, such as a static random access memory (SRAM) for example, a problem exists in that the conventional image processing device is high priced.

The present disclosure provides an image processing device for performing image transformation, which requires no high-capacity work line buffers even if the amount of displacement to be corrected in a vertical correction operation is large.

In order to achieve the above object, an image processing device according to the present disclosure processes image data in units of segments, into which a line is horizontally divided, and manages the line position of the image data stored in a work line buffer for each of the segments, into which a line is horizontally divided, to limit the capacity of the required line buffer to a small value.

Specifically, the present disclosure provides an image processing device for transforming an image including a frame memory unit configured to store an input image, a coordinate transformation unit configured to transform each of pixel coordinate pairs of an output image into each of pixel coordinate pairs of the input image, a read position determiner configured to determine, for each of horizontal segments, a position of image data to read from the frame memory unit based on vertical coordinates calculated by the coordinate transformation unit, a line buffer unit configured to store a plurality of lines of image data read from the frame memory unit in units of the horizontal segments, a stored-line position memory unit configured to store, for each of the horizontal segments, a line position of the image data stored in the line buffer unit, and a vertical interpolator configured to perform a one-dimensional vertical interpolation operation on each of outputs of the line buffer unit, where the read position determiner determines a line position to read based on values, in a target horizontal segment, of the vertical coordinates calculated by the coordinate transformation unit, and the vertical interpolator determines vertical interpolation positions for the output of the line buffer unit based on the vertical coordinates calculated by the coordinate transformation unit, and on the line position stored, for each of the horizontal segments, in the stored-line position memory unit.

The configuration described above allows the image processing device for performing image transformation according to the present disclosure to divide a horizontal line into segments, to manage the line position of image data to be stored in the work line buffer individually for each of the segments, and then to store the image data to be stored in the work line buffer, thereby allowing the memory capacity needed for the work line buffer to be reduced to a relatively small value, even if the amount of displacement to be corrected in a vertical correction operation is large in the entire length of one horizontal line.

As described above, an image processing device of the present disclosure achieves a vertical correction operation which can process a large amount of displacement in the image data, while significantly reducing the memory capacity needed for the work line buffer necessary for a vertical correction operation.

BRIEF DESCRIPTION OF THE DRAWINGS

FIG. 1 is a block diagram of an image processing device according to the first embodiment.

FIG. 6 is an illustrative diagram for explaining coordinate transformation to perform tilt correction.

DETAILED DESCRIPTION

An embodiment is described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor provides the following description and the attached drawings to enable those skilled in the art to fully understand the present disclosure. Thus, the description and the drawings are not intended to limit the scope of the subject matter defined in the claims.

First Embodiment

FIG. 1 is a block diagram of an image processing device according to the first embodiment of the present disclosure.

In FIG. 1, an imaging unit 101 transforms an optical image incident from a lens unit 100 into an electrical video signal, and a frame memory 102 stores video data as an input image. As shown by the horizontal dotted lines in FIG. 2A, the frame memory 102 stores the input image in units of lines.

Figure 3:
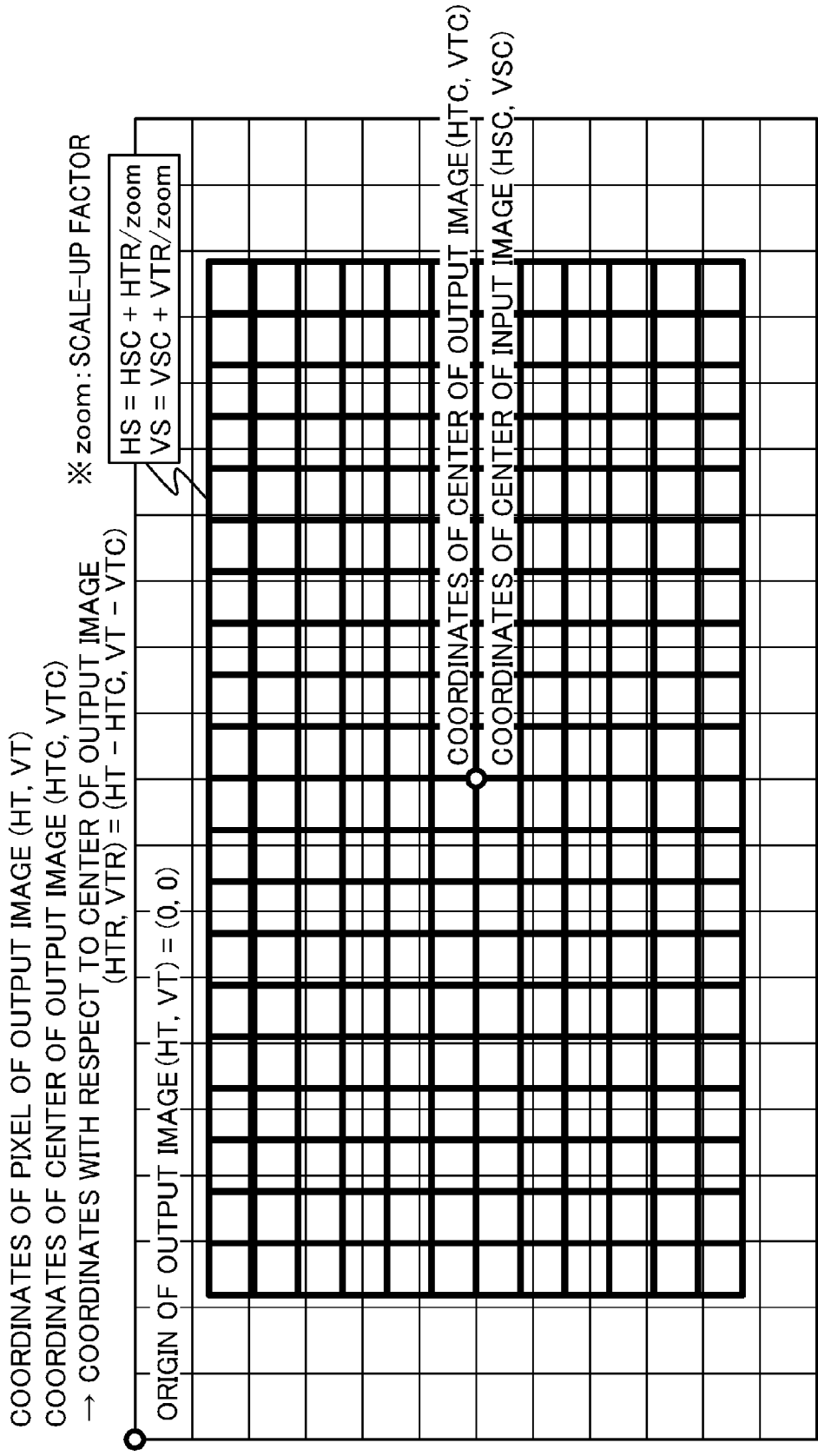
FIG. 3 is an illustrative diagram for explaining coordinate transformation to scale up an image.

An output image coordinate generator 104 generates coordinate pairs corresponding to respective pixels included in an output image. A coordinate transformation unit 105 performs coordinate transformation corresponding to intended image transformation, and calculates coordinate pairs of the input image corresponding to the respective pixels included in the output image. For example, assuming that the coordinate pair of each pixel included in the output image is (HT, VT) (HT and VT are integers) having a pixel pitch of 1, in addition to the origin (0, 0), which is located at the top left corner of the video area as shown in FIG. 3, the coordinate pair (HS, VS) (HS and VS are real numbers) of the input image is obtained by transforming the coordinates using the equation shown in FIG. 3 when scaling up an image. That is, when the coordinate pairs of the pixels included in the output image are transformed into the coordinate pairs of the input image, the thin lines representing the horizontal and vertical lines of the output image in a matrix format are transformed into the bold lines. Calculating coordinate pairs (real number values) of the input image with respect to all the pixels included in the output image, and forming the output image using the pixel values calculated for the respective coordinate pairs of the input image causes the region of the input image shown by the bold lines to be transformed into the region shown by the thin lines, and then the transformed region to be output. In addition, transformation to correct pincushion distortion and barrel distortion can be achieved by respectively using the equations shown in FIGS. 4 and 5, and by adjusting the functions fh and fv for coordinate transformation corresponding to the distortion based on lens position information 103 received from the lens unit 100. Transformation to correct a tilt can be achieved by coordinate transformation using the equation shown in FIG. 6.

Figure 4:
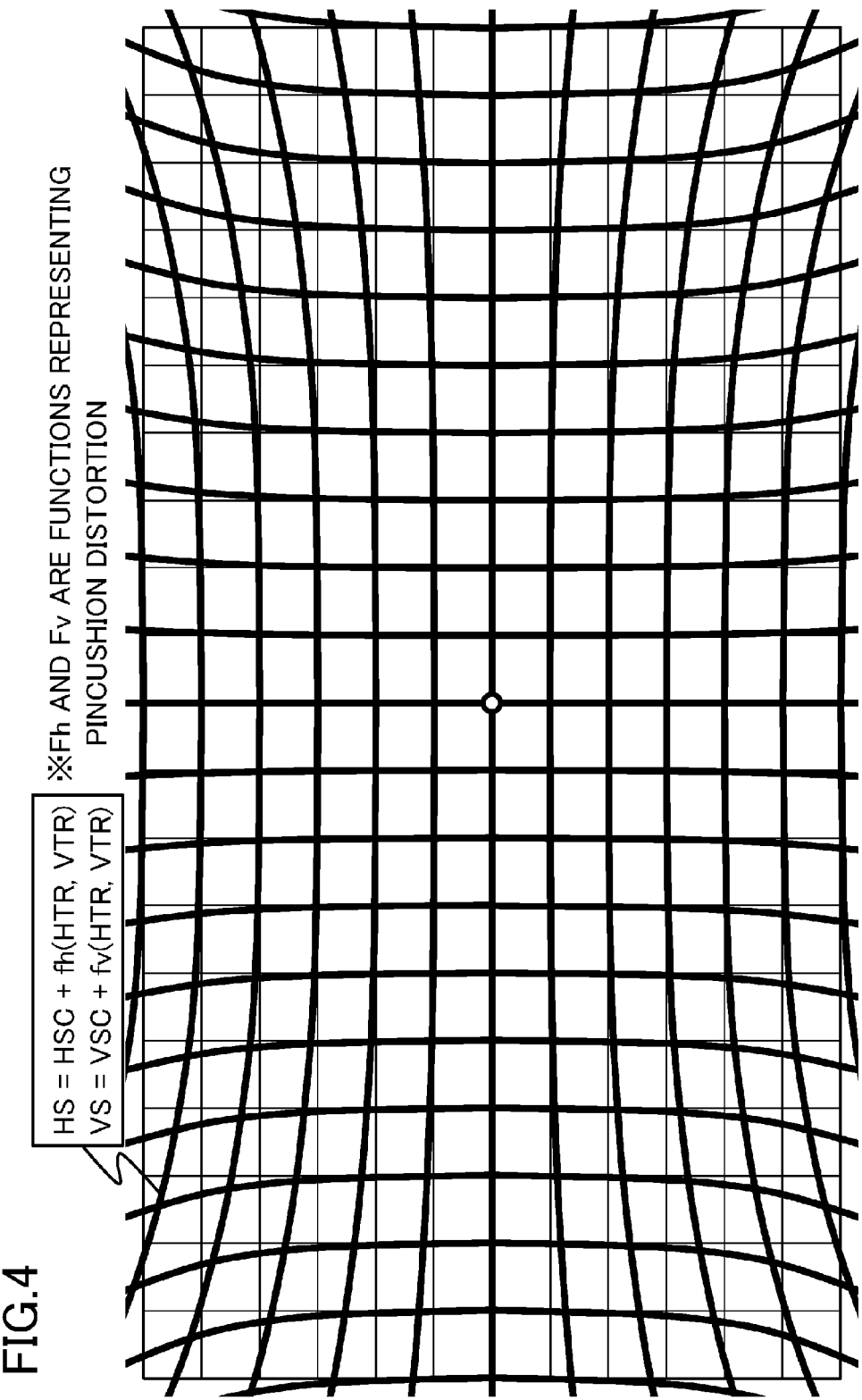
FIG. 4 is an illustrative diagram for explaining coordinate transformation to correct pincushion distortion.
Figure 5:
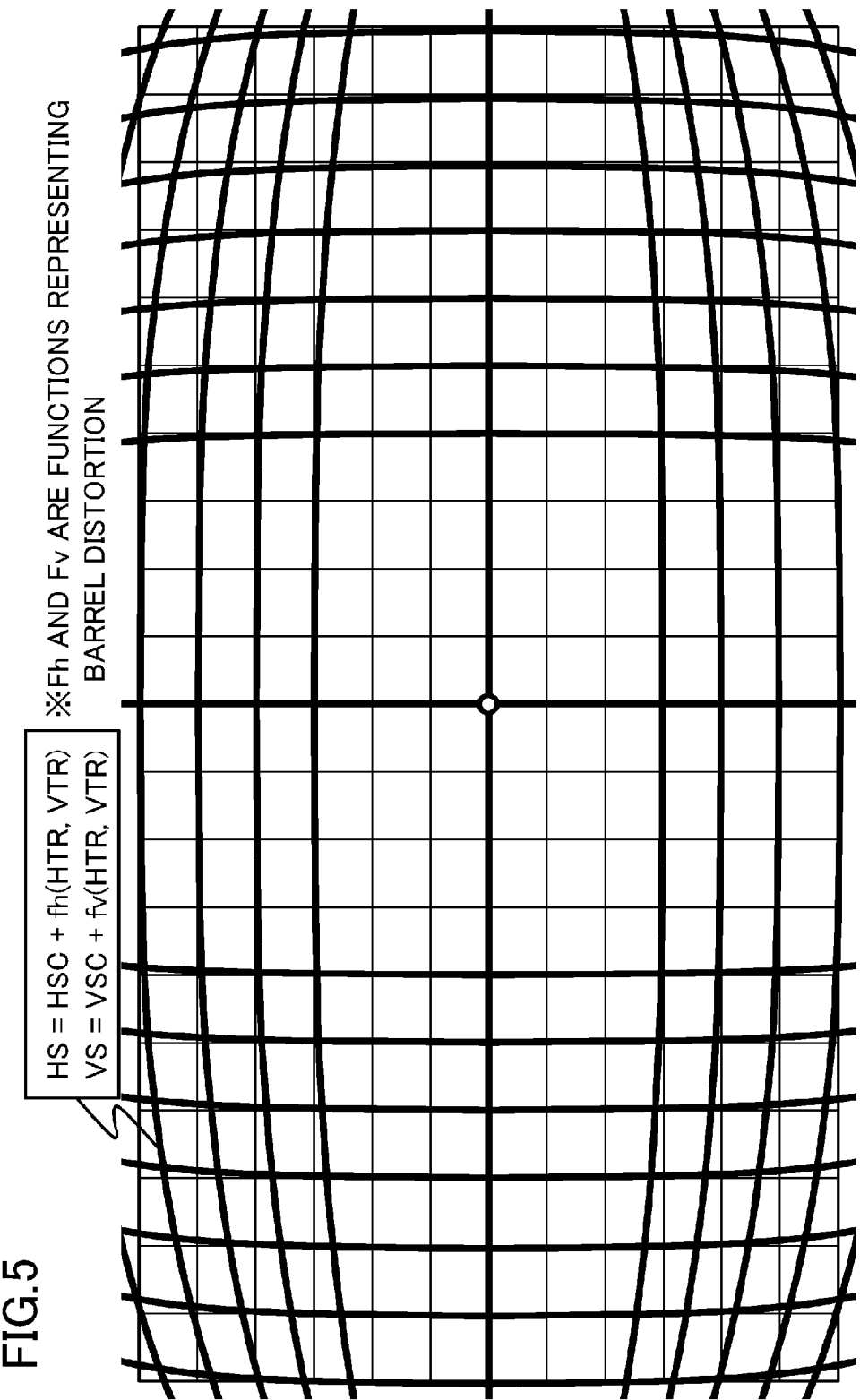
FIG. 5 is an illustrative diagram for explaining coordinate transformation to correct barrel distortion.

Although image transformation has been described using examples relating to scaling-up transformation, pincushion distortion correction, barrel distortion correction, and tilt correction, the image transformation may be of other types such as trapezoidal distortion correction, or any combination of two or more distortion correction approaches such as a combination of trapezoidal distortion correction and tilt correction. Moreover, besides the image transformation to correct a distorted image as described above, image transformation may also be, in contrast, an extended correction which intentionally provides distortion correction, such as when the pincushion distortion correction of FIG. 4 is performed on an undistorted normal image so as to create a fish-eye effect, or when tilted normal image data is intentionally distorted to transform the image data into horizontal data. Thus, the image processing device of FIG. 1 is applicable to two types of image transformation: one for correcting image distortion, and one for providing distortion to an undistorted normal image.

Figure 2A:
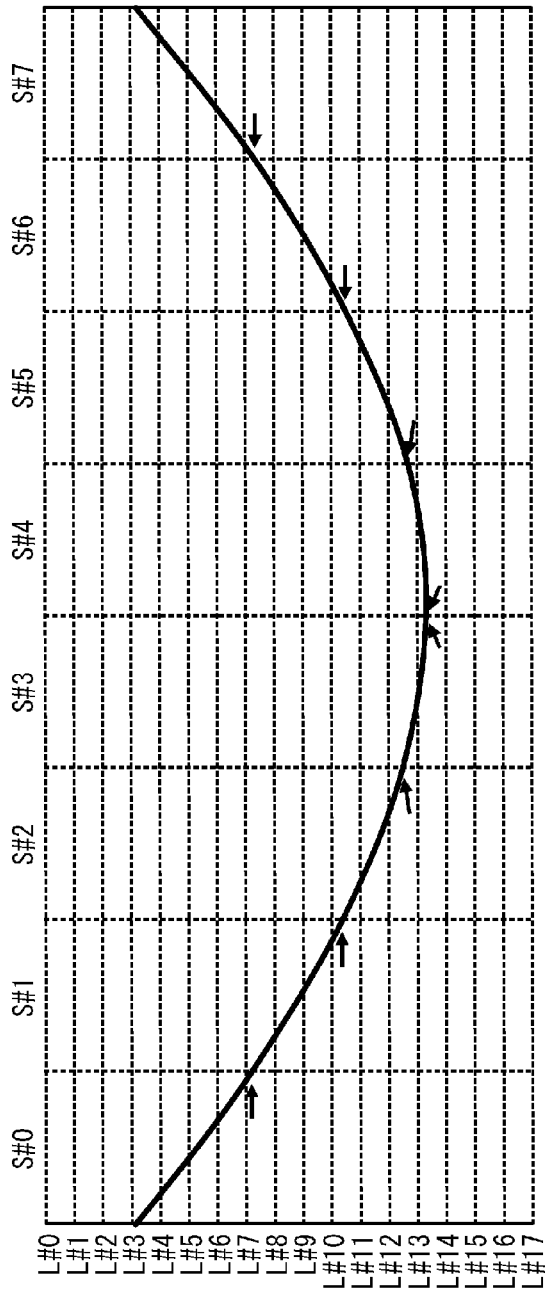
FIG. 2A is a diagram illustrating an operation of the image processing device to store an input image in the frame memory.

Image data at a position determined by the read position determiner 106 based on the vertical coordinates of the input image calculated by the coordinate transformation unit 105 as described above is read from the frame memory 102, and is stored in the line buffer 107. The frame memory 102 processes image data in units referred to as "segments," into which a line is horizontally divided, as shown by the vertical dotted lines in FIG. 2A. Image data transfer from the frame memory 102 to the line buffer 107 is also performed in units of the segments. In FIG. 2A, the horizontal dotted lines represent the lines (L#0-L#17) of the input image, and the vertical dotted lines represent the boundaries between the segments (S#0-S#7). The stored-line position memory unit 108 stores information on the vertical position in the input image, of the image data stored in the line buffer 107, in units of the segments.

Focusing on a particular line of the scan lines included in the output image, the operation described above will be described in detail below, assuming that coordinate transformation of the coordinate pairs of the pixels included in the particular line by the coordinate transformation unit 105 causes the traces of the coordinate pairs of the input image into the solid line of FIG. 2A. If the maximum value of the vertical coordinates, calculated by the coordinate transformation unit 105, within the horizontal segment S#0 is approximately 7.2, then the read position determiner 106 instructs the frame memory 102 to provide the image data at a line position L#8, to which the value 7.2 is rounded up, with respect to the horizontal segment S#0, and the image data read is inserted into the area of the horizontal segment S#0 in the line buffer 107. Assuming that the number of lines stored (the number of vertical coordinates stored) in the line buffer 107 is seven, this operation causes the image data at the line positions L#2-L#8 of the input image to be stored in the area of the horizontal segment S#0 in the line buffer 107. During this operation, the stored-line position memory unit 108 stores the uppermost line position "2" of the image data which is stored in the area of the horizontal segment S#0 in the line buffer 107, as a reference line position for the horizontal segment S#0. Iterating similar operations for the other horizontal segments S#1-S#7 causes image data near the traces of the coordinate pairs of the input image to be stored in the line buffer 107 as shown in FIG. 2B.

Figure 2B:
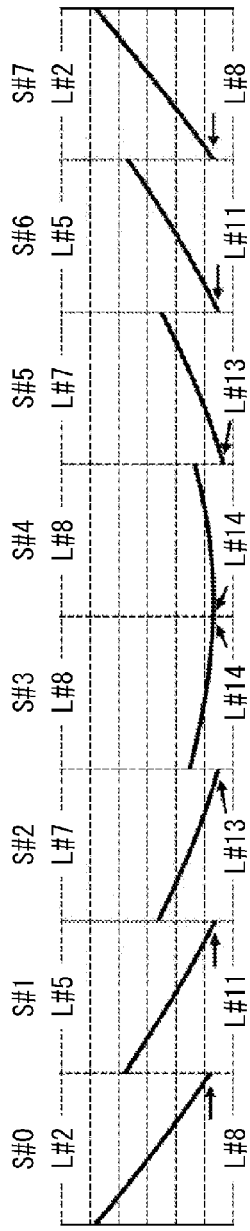
FIG. 2B is a diagram illustrating an operation of the image processing device to store an input image in the line buffer.

Next, the line buffer 107 outputs the image data as shown in FIG. 2B, and the stored-line position memory unit 108 outputs the reference line positions of the respective segments of the image data output from the line buffer 107. Using the differences between the reference line position and the vertical coordinates calculated for each pixel included in each line by the coordinate transformation unit 105, the vertical interpolator 109 performs a vertical interpolation operation, thereby calculating the pixel value at each of positions on the traces of the coordinate pairs of the input image as shown by the solid line of FIG. 2A. Specifically, data at a same horizontal position to be processed with a vertical interpolation filter, in other words, data linearly aligned in a vertical direction, are selected from a plurality lines of image data output from the line buffer 107 based on the integer parts of the differences between the reference line positions and the vertical coordinates in the horizontal segments S#0-S#7; the coefficient sets of the vertical interpolation filter are switched based on the fractional parts of the differences between the reference line positions and the vertical coordinates in the horizontal segments S#0-S#7; and a filtering operation to multiply the selected data string by the selected coefficient set is performed, thereby providing interpolation with a resolution less than the line spacing. Although the simplest vertical interpolation filtering operation is two-tap linear interpolation (weighting by distance), the process shown in FIG. 2B selects two data values of two lines which sandwich therebetween the trace shown by the solid line, and weights the selected data values by the distances between the two data values of the two lines and the trace, and thus the pixel values corresponding to the positions of the trace can be obtained.

As described above, a vertically transformed image is output from the vertical interpolator 109, and is then input to the horizontal interpolator 110, which transforms the input image in the horizontal direction. The horizontal interpolator 110 selects pixel data to be processed with a horizontal interpolation filter from the data linearly aligned in a horizontal direction based on the integer parts of the horizontal coordinates calculated by the coordinate transformation unit 105; the coefficient sets of the horizontal interpolation filter are switched based on the fractional parts of the horizontal coordinates; and the data string selected is multiplied by the coefficient set selected, thereby providing interpolation for positions between pixels.

Thus, image data on which vertical and horizontal transformation has been performed is finally generated.

If a vertical interpolation filter having many taps is used to perform high-accuracy vertical interpolation, the read position determiner 106 outputs a higher read line position for the image data depending on the number of taps of the vertical interpolation filter. In other words, the read line position is set to a value higher than the value calculated by rounding up the maximum value of the vertical coordinates in each segment calculated by the coordinate transformation unit 105.

Figure 7A:
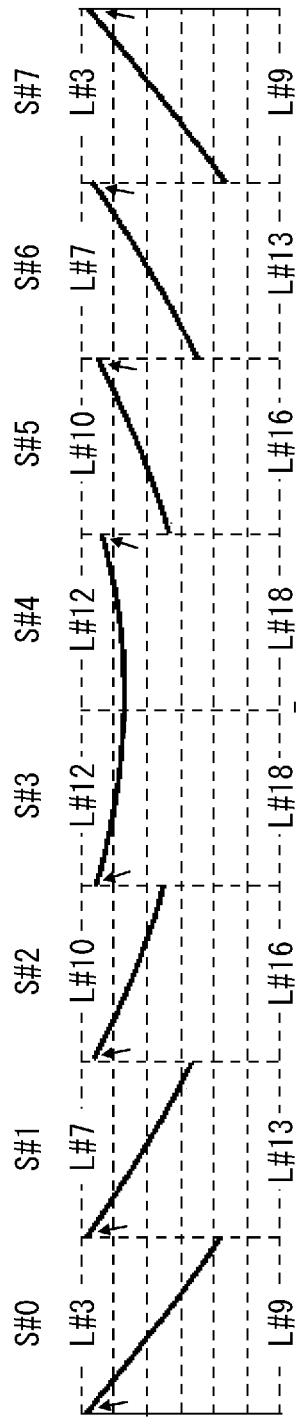
FIG. 7A is a diagram illustrating a variation of the operation of the image processing device to store an input image in the line buffer.
Figure 7B:
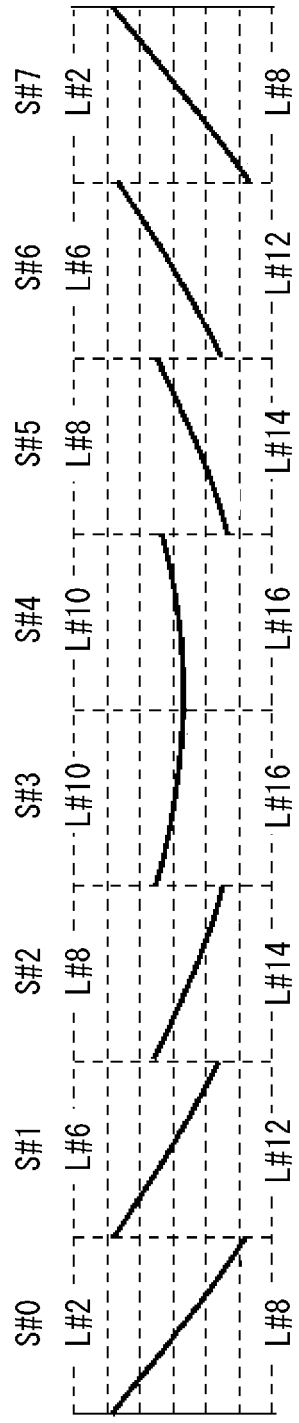
FIG. 7B is a diagram illustrating another variation of the operation to store an input image in the line buffer.
Figure 8:
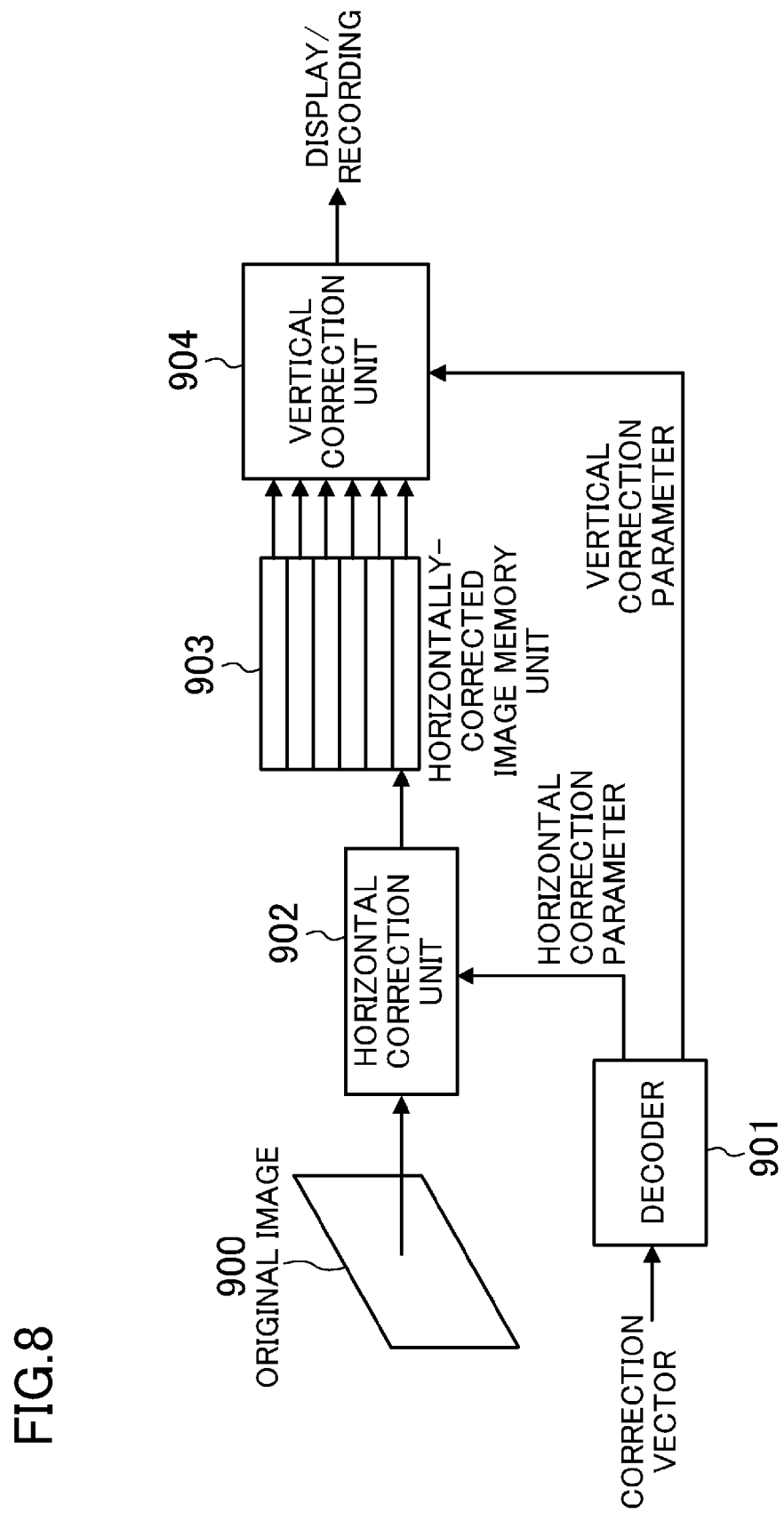
FIG. 8 is a block diagram of a conventional image processing device.

Besides the approach using the maximum values of the vertical coordinates, the read position determiner 106 may determine the read line position based on the minimum value of the vertical coordinates in each segment as shown in FIG. 7A, or based on the average value or the median of the vertical coordinates in each segment as shown in FIG. 7B.

If the amplitude of the trace of the coordinate pair of the input image in each segment is large, then the number of lines of the line memory provided in the line buffer 107 needs to be increased.

That is, the number of lines of the line memory to be provided in the line buffer 107 depends on the amplitude of the trace of the coordinate pair of the input image in each segment and the number of taps of the vertical interpolation filter used. In other words, increasing the number of horizontal divisions of each line to decrease the width of the segments enables a larger tilt of the trace of the coordinate pair of the input image to be corrected, that is, enables image transformation involving more significant distortion and/or larger rotation angle without need to increase the memory capacity of the line buffer 107 (i.e., without an increase in the number of lines to be stored). However, an increase in the number of horizontal segments causes the number of values needed to be stored in the stored-line position memory unit 108 to be increased. If a double data rate (DDR) memory is used as the frame memory 102, then determining the width of the segments based on the burst length in a burst transfer mode can improve the data transfer efficiency of image data transferred from the frame memory 102 to the line buffer 107.

Although the image processing device shown in FIG. 1 includes the horizontal interpolator 110 downstream of the vertical interpolator 109, the present disclosure is not limited to such a configuration; obviously, the horizontal interpolator 110 may be provided upstream of the frame memory 102 (i.e., downstream of the imaging unit 101).

As described above, the first embodiment has been described as an example technique disclosed in the present application. However, the techniques according to the present disclosure are not limited to this embodiment, but are also applicable to those where modifications, substitutions, additions, and omissions are made.

In particular, use of a programmable microcomputer as an example of the vertical interpolator 109 will allow the process details to be changed by a program modification, thereby increases flexibility in designing the vertical interpolator 109. The vertical interpolator 109 may also be implemented by a hardware logic circuitry. Implementing the vertical interpolator 109 by a hardware logic circuitry is advantageous in increasing the process speed. The vertical interpolator 109 may be configured by a single element, or by a plurality of physically distinct elements. If configured by a plurality of physically distinct elements, the operations defined in the claims may be achieved by the set of the individual elements. In such a case, the plurality of elements can be deemed to constitute the single vertical interpolator 109. In contrast, the vertical interpolator 109 and a member having another function may be implemented by a single element.

The image processing device according to the present disclosure allows an image to be significantly transformed using a work line buffer having a relatively small memory capacity, and is thus useful for image transformation in imaging devices such as digital still and video cameras.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. An image processing device for transforming an image, comprising:
    a frame memory unit configured to store an input image;
    a coordinate transformation unit configured to transform each of pixel coordinate pairs of an output image into each of pixel coordinate pairs of the input image;
    a read position determiner configured to determine, for each of horizontal segments, a position of image data to read from the frame memory unit based on vertical coordinates calculated by the coordinate transformation unit;
    a line buffer unit configured to store a plurality of lines of image data read from the frame memory unit in units of the horizontal segments;

a stored-line position memory unit configured to store, for each of the horizontal segments, a line position of the image data stored in the line buffer unit; and a vertical interpolator configured to perform a one-dimensional vertical interpolation operation on each of outputs of the line buffer unit, wherein the read position determiner determines a line position to read based on values, in a target horizontal segment, of the vertical coordinates calculated by the coordinate transformation unit, the vertical interpolator determines vertical interpolation positions for the output of the line buffer unit based on the vertical coordinates calculated by the coordinate transformation unit, and on the line position stored, for each of the horizontal segments, in the stored-line position memory unit, and a result of a one-dimensional vertical interpolation operation performed by the vertical interpolator is output for subsequent use in real-time without being written back to the frame memory unit.

2. The image processing device of claim 1, comprising:

a horizontal interpolator provided downstream of the vertical interpolator, wherein the horizontal interpolator performs a one-dimensional horizontal interpolation operation on each of outputs of the vertical interpolator based on each of horizontal coordinates calculated by the coordinate transformation unit.

3. The image processing device of claim 1, wherein if the input image is distorted, the vertical interpolator performs the one-dimensional vertical interpolation operation so that distortion of the input image is corrected.

4. The image processing device of claim 1, wherein if the input image is an undistorted normal image, the vertical interpolator performs the one-dimensional vertical interpolation operation so as to perform an extended correction which provides distortion correction for the normal image.

* * * * *